United States Patent
Binder (10) Patent No.: US 10,442,420 B2
(45) Date of Patent: Oct. 15, 2019

(54) DIFFERENTIAL TRAVEL SENSOR FOR A BRAKING SYSTEM OF A VEHICLE AND METHOD FOR ASCERTAINING A DIFFERENTIAL TRAVEL

(71) Applicant: Robert Bosch GmbH, Stuttgart (DE)

(72) Inventor: Christian Binder, Neckarsulm (DE)

(73) Assignee: Robert Bosch GmbH, Stuttgart (DE)

( * ) Notice: Subject to any disclaimer, the term of this patent is extended or adjusted under 35 U.S.C. 154(b) by 735 days.

(21) Appl. No.: 14/365,096

(22) PCT Filed: Oct. 23, 2012

(86) PCT No.: PCT/EP2012/070917
§ 371 (c)(1),
(2) Date: Jun. 12, 2014

(87) PCT Pub. No.: WO2013/091937
PCT Pub. Date: Jun. 27, 2013

(65) Prior Publication Data
US 2015/0027214 A1    Jan. 29, 2015

(30) Foreign Application Priority Data

Dec. 19, 2011    (DE) .......................... 10 2011 088 950

(51) Int. Cl.
*B60T 17/22* (2006.01)
*B60T 7/04* (2006.01)
*B60T 13/74* (2006.01)
*B60T 13/12* (2006.01)
(Continued)

(52) U.S. Cl.
CPC ............... *B60T 17/22* (2013.01); *B60T 7/04* (2013.01); *B60T 7/042* (2013.01); *B60T 13/12* (2013.01);
(Continued)

(58) Field of Classification Search
CPC . B60T 17/22; B60T 7/04; B60T 7/042; B60T 13/12; B60T 13/66
(Continued)

(56) References Cited

U.S. PATENT DOCUMENTS 4,225,019 A * 9/1980 Blomberg ............... B60T 8/171
188/181 R
4,235,316 A * 11/1980 Blomberg ............... B60T 8/171
188/181 R
(Continued)

FOREIGN PATENT DOCUMENTS

CN    102029995 A    4/2011
DE    100 10 042    7/2001
(Continued)

OTHER PUBLICATIONS

International Search Report for PCT/EP2012/070917, dated Mar. 8, 2013.

*Primary Examiner* — John Fitzgerald
*Assistant Examiner* — Rodney T Frank
(74) *Attorney, Agent, or Firm* — Norton Rose Fulbright US LLP; Gerard Messina (57) ABSTRACT

A differential travel sensor for a braking system of a vehicle includes: a field generation component, with the aid of which a first electrical and/or magnetic field having a predefined intensity distribution is generated in a spatial axis system fixedly definable with respect to a first body which is a driver brake force transmission component or an actuator force transmission component; and a sensor unit detecting at least one intensity variable of a second electrical and/or magnetic field generated due to an interaction of the first electrical and/or magnetic field with a second body, the second body being different from the first body and being the
(Continued)

driver brake force transmission component or the actuator force transmission component.

23 Claims, 4 Drawing Sheets

(51) Int. Cl.
  *B60T 13/66* (2006.01)
  *G01B 7/00* (2006.01)
(52) U.S. Cl.
  CPC ............ *B60T 13/66* (2013.01); *B60T 13/743* (2013.01); *B60T 13/745* (2013.01); *G01B 7/003* (2013.01)
(58) Field of Classification Search
  USPC .......................................................... 73/129
  See application file for complete search history.

(56) References Cited

U.S. PATENT DOCUMENTS

| | | | |
|---|---|---|---|
| 4,554,451 A | 11/1985 | Kirstein | |
| 5,115,186 A | 5/1992 | Reinartz et al. | |
| 6,545,852 B1* | 4/2003 | Arnold | B60T 17/22 361/152 |
| 2003/0000307 A1 | 1/2003 | Lohberg | |
| 2004/0155647 A1 | 8/2004 | Green et al. | |
| 2006/0025897 A1* | 2/2006 | Shostak | B60C 23/005 701/1 |
| 2009/0115242 A1 | 5/2009 | Ohtani et al. | |
| 2011/0011660 A1* | 1/2011 | Najt | B60K 5/08 180/65.275 |
| 2011/0074209 A1* | 3/2011 | Ueno | B60T 13/745 303/20 |
| 2011/0251769 A1* | 10/2011 | Weiberle | B60T 1/10 701/70 |
| 2012/0201657 A1* | 8/2012 | Donnelly | F02C 6/20 415/123 |

FOREIGN PATENT DOCUMENTS

| | | |
|---|---|---|
| DE | 10 2009 047263 | 6/2010 |
| EP | 0 096 152 | 12/1983 |
| KR | 20060006916 A | 1/2006 |

* cited by examiner

DIFFERENTIAL TRAVEL SENSOR FOR A BRAKING SYSTEM OF A VEHICLE AND METHOD FOR ASCERTAINING A DIFFERENTIAL TRAVEL

BACKGROUND OF THE INVENTION

1. Field of the Invention

The present invention relates to a differential travel sensor for a braking system of a vehicle, and to a method for ascertaining a differential travel present between a driver brake force transmission component and an actuator force transmission component of a braking system.

2. Description of the Related Art

A brake booster is described in published German patent application document DE 10 2009 47 263 A1. The brake booster has a differential travel sensor, which is referred to as a position sensor. The differential travel sensor is situated on a booster body to transmit an actuator force to at least one displaceable piston of the brake master cylinder in such a way that the differential travel sensor is displaceable together with the booster body. The differential travel sensor is to be designed for the purpose of measuring a relative movement, i.e., a displacement of a piston rod for transmitting a driver brake force to the at least one displaceable piston of the brake master cylinder in relation to the booster body.

BRIEF SUMMARY OF THE INVENTION

A spatial axis system, which is definable/defined fixedly in relation to the first body, is to be understood as a spatial system which is displaceable together with the first body compared to a stationary system, in relation to which the actuator force transmission component and the driver brake force transmission component are displaceable. In contrast, the first body assumes a constant location/position in the spatial axis system, which is definable/defined fixedly in relation to the first body, in spite of a displacement movement of the first body in relation to the stationary system. The spatial axis system, which is definable/defined fixedly in relation to the first body, may therefore be referred to as a spatial system which moves along with the first body.

The fixedly predefined intensity distribution of the first electrical and/or magnetic field may be understood to mean that independently of a location/position of the first body in relation to the stationary system, the first electrical and/or magnetic field always has the same intensity distribution in the spatial axis system which is definable/defined fixedly in relation to the first body. It is to be noted that the intensity distribution does not necessarily have to be understood as absolute intensity values of the first electrical and/or magnetic field. Instead, the intensity distribution may also be understood as a differential value distribution of the first electrical and/or magnetic field.

The present invention implements a differential travel sensor including a sensor unit, whose location with respect to a vehicle electrical system and/or a vehicle control device may be kept constant in spite of a displacement movement of the driver brake force transmission component and the actuator force transmission component, respectively. This may also be described by saying that the sensor unit of the differential travel sensor, which is implementable with the aid of the present invention, may be situated fixed in place on the vehicle. The execution of a displacement movement of the sensor unit in relation to a power supply and analysis component of the sensor unit, which is situated fixedly on the vehicle or is fixed in place, and which is generally necessary according to the related art, is therefore omitted in the present invention. The power supply of the sensor unit may therefore be implemented easily. In addition, the sensor unit may cooperate in a simple way with at least one electronic system implemented externally thereto, without complicated lines, which permit(s) a displacement movement of the sensor unit in relation to this electronic system having to be implemented for this purpose.

It is to be noted in particular that in the present invention, the attachment of the sensor unit to the driver brake force transmission component or to the actuator force transmission component is not necessary. The sensor unit therefore also does not have to be designed for the travel/stroke (of up to 42 mm) carried out during braking operation by these transmission components. Contacting of the sensor unit via a moving cable, or a sliding contact, is therefore also not necessary. This saves costs in the implementation of the differential travel sensor.

Since the present invention permits reliable determination of the differential travel at acceptable costs and with comparatively little work outlay, it is not necessary to determine the differential travel with the aid of a first absolute travel of the driver brake force transmission component and a second absolute travel of the actuator force transmission component. This permits improved precision of the determined differential travel. Therefore, the advantages of a differential travel sensor compared to an absolute travel sensor may be used cost-effectively by the present invention. Simultaneously, an advantageous reliability of a braking system which is controlled/driven under consideration of the determined differential travel, or the established item of output information, is increased.

Since the differential travel is determinable very precisely with the aid of the present invention, the malfunctions of the braking system, which conventionally occur frequently, do not occur upon the use of the present invention. For example, it is not a concern that brake force boosting will be omitted by the braking system due to an unrecognized differential travel not equal to zero. Instead, the braking system operated with use of the present invention may reliably be regulated to a differential travel equal to zero, an actuator force, which corresponds to the driver brake force, being able to be reliably exerted on the at least one displaceable piston of the brake master cylinder to assist the driver with respect to force. The risk is also dispensed with that a differential travel which is incorrectly indicated to be excessively large will result in an excess use of the actuator, which may in turn contribute to an additional increase of the differential travel. These problems may be reliably remedied with the aid of the present invention.

In one advantageous specific embodiment, the field generation component includes a permanent magnet which may be situated fixedly on the first body. The first electrical and/or magnetic field, which is fixedly predefined with respect to the first body, may therefore be generated as a magnetic field in a simple way, without a power supply cable having to be led to the first body for this purpose.

In another formal specific embodiment, the field generation component includes a light source. The light source may be situated in particular adjacent to the driver brake force transmission component or the actuator force transmission component in such a way that the driver brake force transmission component and the actuator force transmission component are displaceable in relation to the light source. The necessity is therefore omitted of situating the light source on the first body so it is also displaceable and to lay a power supply line for the light source, which is also movable, to the first body. Instead, the light source, which may be situated fixedly on a vehicle framework/in a stationary way, may be oriented onto a light-transmissive area/a gap/an aperture of the first body in such a way that the first electrical and/or magnetic field, which is fixedly predefined in relation to the first body, is oriented as an electromagnetic field through the light-transmissive area/the gap/the aperture in the direction toward the second body.

The advantages listed in the paragraphs above are also ensured in the case of a brake booster device for a braking system of a vehicle having such a differential travel sensor.

In one advantageous specific embodiment, the brake booster device includes the driver brake force transmission component and the actuator force transmission component. This permits an implementation of at least one transmission component for an advantageous interaction with the first electrical and/or magnetic field.

For example, the driver brake force transmission component or the actuator force transmission component, which interacts with the permanent magnet of the field generation component as the second body, may be produced at least partially from a ferromagnetic material. This permits a reliable determination of the at least one intensity variable also with the aid of a cost-effective analysis unit.

Alternatively or additionally thereto, at least one light-transmissive area may be implemented in each case in the driver brake force transmission component and in the actuator force transmission component. Therefore, on the basis of an intensity of a light beam which possibly penetrates through the superimposed light-transmissive areas, an item of information with respect to the position of the driver brake force transmission component and the actuator force transmission component may be reliably obtained.

In one advantageous refinement, at least one first light-transmissive area and one second light-transmissive area are implemented in each case in the driver brake force transmission component and in the actuator force transmission component, the first light-transmissive area of the driver brake force transmission component being implemented in a location in relation to the second light-transmissive area of the driver brake force transmission component which is offset in relation to another location of the first light-transmissive area of the actuator force transmission component in relation to the second light-transmissive area of the actuator force transmission component by a route, which is aligned in parallel to a displacement axis, along which the driver brake force transmission component is displaceable in relation to the actuator force transmission component. This may also be referred to as an opposing arrangement of the at least two light-transmissive areas on the driver brake force transmission component and on the actuator force transmission component. In this way, a chronological or a spatial variation of a power of the light source may be averaged out reliably, without this resulting in an error in the establishment of the differential travel.

The driver brake force transmission component may be at least one subunit of an input piston, via which a driver brake force is transmittable from a brake actuation element to at least one displaceable piston of a brake master cylinder. The actuator force transmission component may accordingly also be at least one subunit of a booster piston, via which an actuator force is transmittable from an actuator to the at least one displaceable piston of the brake master cylinder.

Therefore, cost-effective components which are generally already present on a brake booster may be used for the two transmission components.

The above-mentioned advantages are also implemented in a braking system for a vehicle including a corresponding differential travel sensor and/or a corresponding brake booster device.

Furthermore, the above-mentioned advantages are also implemented when carrying out the corresponding method for ascertaining a differential travel present between a driver brake force transmission component and an actuator force transmission component of a braking system.

DETAILED DESCRIPTION OF THE INVENTION

FIGS. 1a through 1d show schematic views of a brake booster and coordinate systems to illustrate one specific embodiment of the method for ascertaining a differential travel.

The method which is schematically depicted in FIGS. 1a through 1d is advantageously suitable for ascertaining a differential travel s which is present between a driver brake force transmission component and an actuator force transmission component of a braking system. The driver brake force transmission component may be understood as a force transmission component which is displaceable with the aid of a driver brake force, via which a driver brake force is transmittable from a brake actuating element (not shown), for example, a brake pedal, to at least one displaceable piston (not shown) of a brake master cylinder. The driver brake force component may be, for example, an input piston/an input rod of a brake booster. However, the implementability of the driver brake force transmission component is not limited to an input piston/an input rod of a brake booster. For example, the driver brake force transmission component may also merely be a component which is displaced during the actuation of the brake actuating element, without transmitting the driver brake force to the at least one displaceable piston of the brake master cylinder.

The actuator force transmission component may be understood as at least one force transmission component, which is movable with the aid of an actuator force of an actuator (not shown). The actuator force may be transmittable to the at least one displaceable piston of the brake master cylinder by the displacement of the actuator force transmission component. The actuator force transmission component may be in particular a booster piston/a booster rod/a booster body of a brake booster. The actuator may be understood, for example, as a motor or a hydraulic unit of a brake booster. However, it is to be noted that the exemplary embodiments of the actuator force transmission component and the actuator are to be understood solely as examples.

Figure 1A:
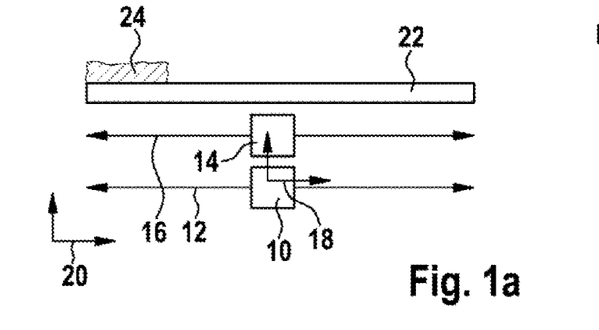
FIGS. 1a through 1d show schematic views of a brake booster and coordinate systems to illustrate one specific embodiment of the method for ascertaining a differential travel.
Figure 1B:
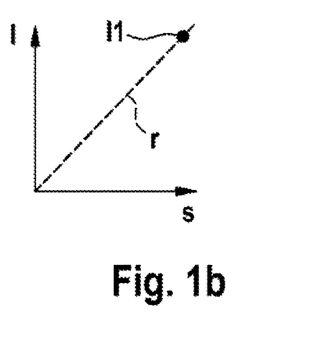
Figure 1C:
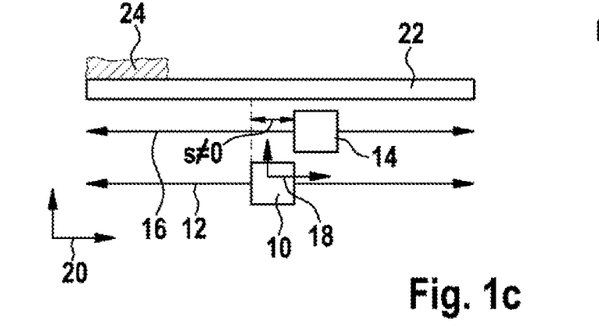

FIGS. 1a and 1c each show a first body 10, which is displaceable along a first movement path 12. First body 10 is the driver brake force transmission component or the actuator force transmission component. In addition, a second body 14, which is displaceable along a second movement path 16, is also shown in each case in FIGS. 1a and 1c. Second body 14 is different from first body 10 and is the driver brake force transmission component or the actuator force transmission component.

In the method schematically depicted in FIGS. 1a through 1d, a first electrical and/or magnetic field having a predefined intensity distribution is generated in a spatial axis system 18, which is definable/defined fixedly with respect to first body 10. This may be understood to mean that the first electrical and/or magnetic field has a predefined intensity distribution in spatial axis system 18, which is definable/defined fixedly with respect to first body 10. The first electrical and/or magnetic field may include, for example, an electrical field, a magnetic field, and/or an electromagnetic field. Spatial axis system 18, which is definable/defined fixedly with respect to first body 10, may be understood, for example, as a spatial system, whose position/location in relation to a space-fixed system 20 is variable with the aid of a displacement of first body 10 (for example, along a path and/or around an axis of rotation). In contrast, a displacement movement of first body 10 (for example, along a path and/or around an axis of rotation) does not cause a change in a position of first body 10 in spatial axis system 18, which is definable/defined fixedly with respect to first body 10. Therefore, the displacement movement of first body 10 (for example, along a path and/or around an axis of rotation) does not result in a change of the intensity distribution of the first electrical and/or magnetic field in spatial axis system 18, which is definable/defined fixedly with respect to first body 10.

The generated first electrical and/or magnetic field may be, for example, a magnetic field having a predefined magnetic field strength distribution in spatial axis system 18, which is definable/defined fixedly with respect to first body 10. To generate such a magnetic field as an at least partial component of the first electrical and/or magnetic field, for example, a permanent magnet (not shown) may be fixedly situated on first body 10. (This may be understood to mean that the permanent magnet is situated on first body 10 in such a way that a displacement movement of first body 10 (for example, along a path and/or around an axis of rotation) does not cause a change of a position of the permanent magnet in relation to first body 10.)

The magnetic field having the magnetic field strength distribution (fixedly) predefined in spatial axis system 18 may therefore be generated without an electrical connection between a (stationary) power source and first body 10. In particular, the necessity is thus dispensed with of implementing a power supply component which functions even during a displacement movement of first body 10 along first movement path 12, for example, a movable cable and/or a sliding contact, between the (stationary) power source and first body 10.

The above-mentioned advantage is also ensured if, to generate an electromagnetic field as an at least partial component of the first electrical and/or magnetic field, light/electromagnetic radiation of a light source, which is situated separately from the driver brake force transmission component and the actuator force transmission component, is oriented onto at least one adjacent light-transmissive area of the driver brake force transmission component or the actuator force transmission component. This may also be described to say that a light of a light source, which is situated to be stationary, is oriented onto first body 10 in such a way that at least a part of the light is incident at least partially in the direction of second body 14 through a light-transmissive area implemented in first body 10.

Figure 1D:
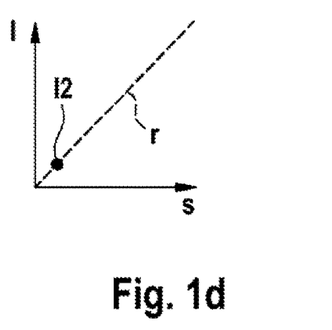
Figure 2A:
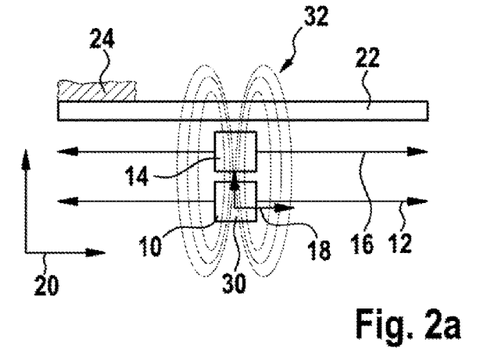
FIGS. 2a through 2d show schematic views of a brake booster device and coordinate systems to explain one first specific embodiment of the differential travel sensor.
Figure 2B:
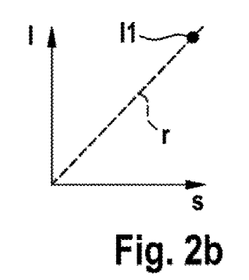
Figure 2C:
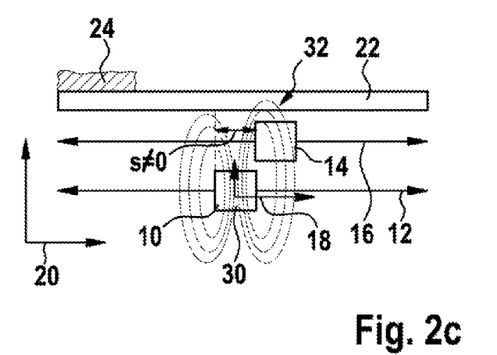
Figure 2D:
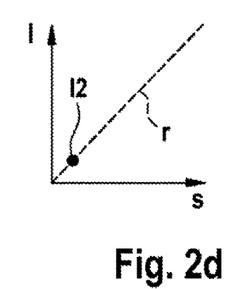
Figure 3A:
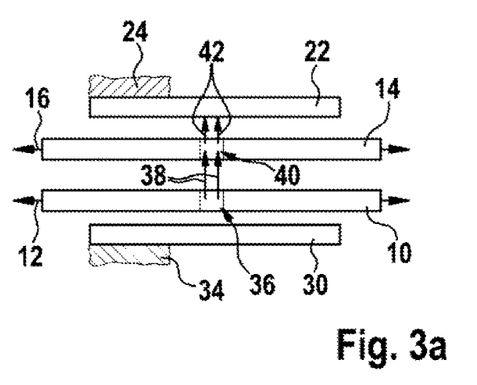
FIGS. 3a through 3d show schematic views of a brake booster device and coordinate systems to illustrate one second specific embodiment of the differential travel sensor.
Figure 3B:
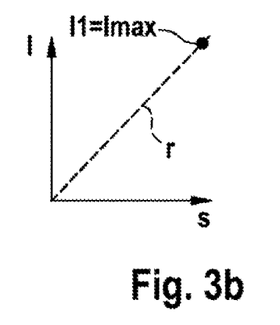
Figure 3C:
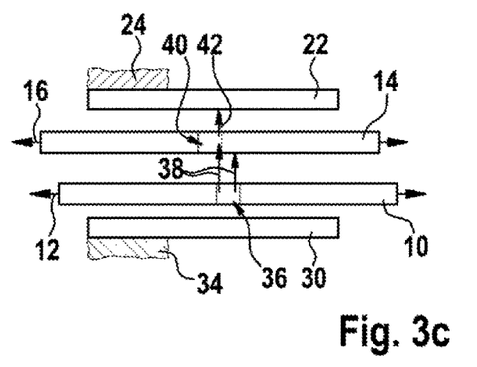
Figure 3D:
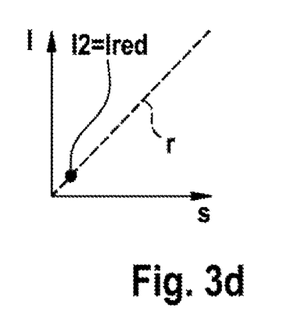

In a further method step of the advantageous method for ascertaining differential travel s, at least one intensity variable I of a second electrical and/or magnetic field, which is generated due to an interaction of the first electrical and/or magnetic field with second body 14, is determined. The interaction between the first electrical and/or magnetic field and second body 14 is dependent on a position/location of second body 14 in relation to the intensity distribution of the first electrical and/or magnetic field, or in relation to spatial axis system 18. Therefore, the interaction is dependent on differential travel s. The at least one intensity variable I is therefore a relation r of differential travel s, as is schematically depicted in the coordinate systems of FIGS. 1b and 1d. First intensity variable I1 indicated in the coordinate system of FIG. 1b corresponds to a differential travel s equal to zero, which is present in the schematic view of FIG. 1a. In contrast, FIG. 1c shows a position of bodies 10 and 14 in relation to one another in the case of a differential travel s not equal to zero, which results in a second intensity variable I2 (FIG. 1d).

The at least one intensity variable I may include, for example, a light intensity and/or a magnetic field strength. To ascertain the at least one intensity variable I, a (stationary) sensor unit 22 may be used, whose location/position (with respect to stationary system 20) is uninfluenced by a displacement movement of first body 10 and/or second body 14 (for example, along a path and/or around an axis of rotation). For example, sensor unit 22 may be installed non-displaceably/fixedly on a vehicle with the aid of at least one fastening component 24. An electrical contact between sensor unit 22 and a power source and/or between sensor unit 22 and an analysis electronic system is also implementable correspondingly simply. An advantageous mode of operation of the at least one electrical contact is therefore also ensured without a movable cable and/or a sliding contact. In addition, the analysis electronic system which interacts with sensor unit 22 may be designed as stationary, and therefore cost-effectively.

Due to relation r between the at least one intensity variable I and differential travel s, or the measurable effect of the different interaction of second body 14 with the first electrical and/or magnetic field in the event of a variation of differential travel s, in a further method step, an item of output information with respect to differential travel s may be reliably established under consideration of the at least one intensity variable I of the second electrical and/or magnetic field. In particular, with the aid of the method described here, differential travel s, or a corresponding output variable, may be determined with a greater precision than in the case of an establishment of differential travel s as a difference of a first absolute travel of first body 10, which is measured with the aid of a first absolute travel sensor, and a second absolute travel of second body 14, which is measured with the aid of a second absolute travel sensor. The measuring principle implementable with the aid of the method described here therefore ensures a greater robustness in relation to measuring errors.

The above-described method may be carried out, for example, with the aid of the specific embodiments described hereafter of a differential travel sensor. However, it is to be noted that the ability to carry out the method is not limited to the use of a specific type of a differential travel sensor.

FIGS. 2a through 2d show schematic views of a brake booster device and coordinate systems to explain a first specific embodiment of the differential travel sensor.

The differential travel sensor schematically depicted in FIGS. 2a through 2d is usable, for example, in a braking system of a vehicle. In particular, the differential travel sensor may be designed for the purpose of cooperating with a brake booster device. However, it is to be noted that the usability described here of the differential travel sensor described hereafter is only to be interpreted as an example.

The differential travel sensor has a field generation component 30, which may be situated/is situated on or adjacent to a driver brake force transmission component of the braking system or an actuator force transmission component of the braking system. With the aid of field generation component 30, a first electrical and/or magnetic field having a predefined intensity distribution may be generated in a spatial axis system 18, which is definable/defined fixedly with respect to a first body 10. As already described above, first body 10 is the driver brake force transmission component or the actuator force transmission component. Exemplary embodiments of the driver brake force transmission component and the actuator force transmission component have already been described above. Reference is also made to the statements made above with respect to the description of spatial axis system 18, which is definable/defined fixedly with respect to first body 10.

A second body, which is different from first body 10 and is the driver brake force transmission component or the actuator force transmission component, interacts with the first electrical and/or magnetic field. This interaction causes a second electrical and/or magnetic field 32.

In the specific embodiment depicted in FIGS. 2a through 2d, field generation component 30 includes a permanent magnet which may be situated fixedly on first body 10. In this case, the driver brake force transmission component or the actuator force transmission component, which interacts with the permanent magnet of field generation component 30 as second body 14, is preferably at least partially produced from a ferromagnetic material. The magnetic field strength distribution of second electrical and/or magnetic field 32 may therefore deviate significantly from the magnetic field strength distribution of the first electrical and/or magnetic field.

The differential travel sensor also has a sensor unit 22, which is designed for the purpose of determining at least one intensity variable I of second electrical and/or magnetic field 32, which may be generated due to the interaction of the first electrical and/or magnetic field with second body 14. Sensor unit 22 may be situated/is situated on/in a vehicle equipped with the differential travel sensor in such a way that the driver brake force transmission component and the actuator force transmission component are displaceable in relation to sensor unit 22. This may also be described as a stationary/immovable arrangement of sensor unit 22. In particular, sensor unit 22 may be installed with the aid of at least one fastening component 24 on a vehicle framework. Due to the ability to fixedly situate/install sensor unit 22, a rigid contact between sensor unit 22 and a power source and/or between sensor unit 22 and an analysis electronic system is sufficient. By dispensing with the necessity of equipping a usable contact with a movable cable and/or a sliding contact, costs may be saved. In addition, sensor unit 22 has improved robustness due to its rigid contacting.

Due to the above-described relation r between differential travel s and the at least one intensity variable I, an analysis unit (not shown) of the differential travel sensor may reliably establish an item of output information with respect to differential travel s present between the brake force transmission component and the actuator force transmission component under consideration of the at least one intensity variable I. The analysis unit may be a subunit of sensor unit 22, for example. The analysis unit may also be a subunit of a central vehicle electronic system. Due to the ability to implement the analysis unit as a subunit of the central vehicle electronic system, the differential travel sensor described here is therefore implementable with a comparatively small installation space requirement. Reference is made to the statements made above with respect to the advantageous precision with which differential travel s may be established with the aid of the differential travel sensor.

For example, under consideration of differential travel s established by the differential travel sensor, an actuator of a brake booster device may be operated/activated in such a way that differential travel s between the driver brake force transmission component and the actuator force transmission component is regulated/set equal to zero. The operated/activated actuator, with the aid of which an actuator force is exertable on the actuator force transmission component, may be an electric motor or a hydraulic unit of the brake force booster device, for example. However, it is to be noted that the usability of the differential travel sensor is not limited to a specific type of a brake booster device cooperating therewith or to a specific design of a braking system equipped therewith.

FIGS. 3a through 3d show schematic views of a brake booster device and coordinate systems to illustrate one second specific embodiment of the differential travel sensor.

The differential travel sensor which is schematically depicted in FIGS. 3a through 3d has a light source as a field generation component 30. The light source preferably may be situated/is situated adjacent to the driver brake force transmission component or the actuator force transmission component in such a way that the driver brake force transmission component and the actuator force transmission component, or first body 10 and second body 14, are displaceable in relation to the light source. This may also be referred to as a stationary arrangement of the light source, which is describable as field generation component 30. For example, the light source may be installed fixedly on the vehicle framework with the aid of at least one fastening component 34. The stationary arrangement of the light source makes its power supply easier. In particular, neither a movable cable nor a sliding contact is necessary for the power supply of the light source as field generation component 30.

Preferably, first body 10 and second body 14 are situated in a beam flux between the light source and sensor unit 22. For example, the light source may be aligned in such a way that at least a part of the emitted radiation is incident in at least one first light-transmissive area 36, for example, an aperture, implemented in first body 10. This causes a light beam 38, which is guided through the at least one light-transmissive area 36 and exits from the at least one light-transmissive area 36, as the first electromagnetic field. First light beam 38 is preferably aligned toward second body 14. A second light-transmissive area 40, for example, an aperture, may also be implemented on second body 14. The at least one light-transmissive area 36 and 40 respectively implemented in first body 10 and in second body 14 is preferably such that, at least in the case of a specific differential travel s, for example, a differential travel s equal to zero (see FIG. 3a), a second light beam 42 having a maximum intensity Imax exits as a second electromagnetic field from the at least one second light-transmissive area 40 of second body 14. Additionally, light-transmissive areas 36 and 38 are preferably implemented in such a way that in the case of at least one further value of the differential travel s, for example, a differential travel s not equal to zero (see FIG. 3d), a second light beam 42 having a reduced intensity Ired in relation to maximum intensity Imax exits from the at least one second light-transmissive area 40 of second body 14. Therefore, the light quantity/light intensity/light power measurable via sensor unit 32 may be reliably established as the at least one intensity variable I of differential travel s.

Figure 4:
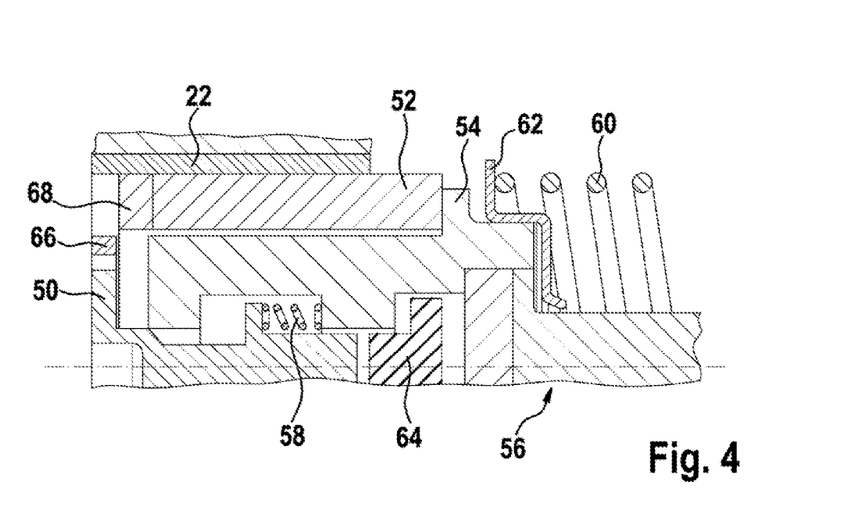
FIG. 4 shows a schematic view of one first specific embodiment of the brake booster device.

FIG. 4 shows a schematic view of one first specific embodiment of the brake booster device.

The brake booster device, which is schematically depicted in FIG. 4, for a braking system of a vehicle is implemented as an electromechanical brake booster including a motor (not shown) as an actuator. However, it is to be noted that the implementability of a brake booster device equipped with a differential travel sensor is not restricted to a specific type of a brake booster.

The brake booster device includes an input piston 50/an input rod as a driver brake force transmission component and a booster piston 52/a booster rod/a booster body as an actuator force transmission component. With the aid of input piston 50, a driver brake force exerted on a brake actuating element (not shown) of the braking system is exertable on at least one displaceable piston 54 of a brake master cylinder 56. (Optionally, a spring 58 may be situated between input piston 50 and displaceable piston 54.) Correspondingly, an actuator force exerted by the actuator of the brake booster device may be transmitted with the aid of booster piston 52 to displaceable piston 54. It is to be noted that the usability of the brake booster device is not limited to a specific type of brake master cylinder 56. There is therefore great freedom of choice with respect to the implementability of the components of brake master cylinder 56, for example, at least one restoring spring 60, or an entrainment element 62 implemented between displaceable piston 54 and restoring spring 60. There is also a large amount of design freedom for the at least one elastic component 64, which is situated on input piston 50 and displaceable piston 54. Components 54 through 64 which are schematically depicted in FIG. 4 are therefore to be interpreted solely as examples.

The brake booster device equipped with the differential travel sensor has a permanent magnet 66 as a field generation component, which is fastened on an input piston 50 used as the first body. In addition, a subsection 68 of booster piston 52, which is used as the second body, is implemented as ferromagnetic. The interaction of section 68 of booster piston 52 with a first magnetic field of permanent magnet 66 may cause a second magnetic field, which is (significantly/detectably) changed in relation to the first magnetic field. Therefore, a sensor unit 22, which is connected with the aid of a fastening element 24 to the vehicle framework, may ascertain at least one intensity variable of the second magnetic field, which is influenced by the differential travel. Subsequently, as already schematically depicted above, the differential travel or an item of output information with respect to the differential travel may be established under consideration of the at least one intensity variable.

Figure 5A:
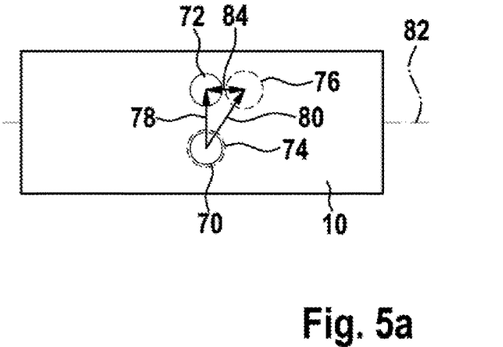
FIGS. 5a and 5b show a schematic side view and a coordinate system to illustrate one second specific embodiment of the brake booster device.
Figure 5B:
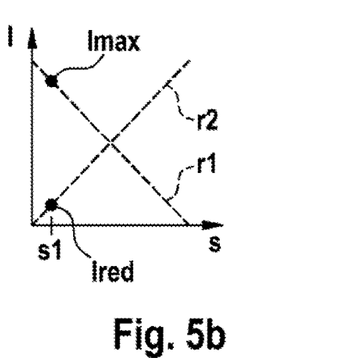

FIGS. 5a and 5b show a schematic side view and a coordinate system to illustrate one second specific embodiment of the brake booster device.

In the specific embodiment schematically depicted in FIGS. 5a and 5b, at least one aperture/one light-transmissive area are implemented in each case in the driver brake force transmission component and the actuator force transmission component (of the brake booster device). First body 10, which is shown in a side view in FIG. 5a, and which is the driver brake force transmission component or the actuator force transmission component, has at least one first light-transmissive area, for example, a first aperture, and one second light-transmissive area 72, in particular a second aperture. In addition, at least one first light-transmissive area 74 and one second light-transmissive area 76 are implemented in second body 14 located behind (the driver brake force transmission component or the actuator force transmission component). First light-transmissive area 70 of first body 10 is implemented in relation to second light-transmissive area 72 of first body 10 in a location which is depicted with the aid of vector 76. Vector 76 extends from the center point of first light-transmissive area 70 of first body 10 to the center point of second light-transmissive area 72 of first body 10.

A vector 80 extends from the center point of first light-transmissive area 74 of second body 14 to the center point of second light-transmissive area 76 of second body 14. Vector 80 thus depicts a location of first light-transmissive area 74 of second body 14 in relation to second light-transmissive area 76 of second body 14. Vector 80 is offset in relation to vector 78 by a route 84, which is aligned parallel to a displacement axis 82, along which second body 14 is displaceable in relation to the first body.

The advantageous implementation of light-transmissive areas 70 through 76 in relation to one another may also be described so that the first light-transmissive area of the driver brake force transmission component is implemented in a location in relation to the second light-transmissive area of the driver brake force transmission component which is offset in relation to another location of the first light-transmissive area of the actuator force transmission component in relation to the second light-transmissive area of the actuator force transmission component by a route 84, which is aligned parallel to the displacement axis, and along which the driver brake force transmission component is displaceable in relation to the actuator force transmission component. Furthermore, the arrangement of light-transmissive areas 70 through 76 may also be referred to as opposing.

The opposing arrangement of first light-transmissive areas 70 and 74 in relation to second light-transmissive areas 72 and 76 is linked to the advantage that in the case of a first differential travel s1, for example, a first differential travel s1 equal to zero, a maximum light intensity Imax passes through first light-transmissive areas 70 and 74 lying on top of each other, while only a reduced light intensity Ired, in particular a minimal light intensity, may pass through second light-transmissive areas 72 and 76 in the case of this first differential travel s1. The opposing arrangement of light-transmissive areas 70 through 76 therefore results in different relationships r1 and r2 between differential travel s and light intensities I passing through light-transmissive areas 70 through 76. This may be used for a compensating analysis of intensity values I. In this way, (chronological and local) variations in the power of the light source used as the field generation component may be compensated for.

The specific embodiments described in the paragraphs above are also transferable to a braking system for a vehicle including a differential travel sensor or a brake booster device. A separate description of such a braking system is therefore also omitted here.

What is claimed is:

1. A differential travel sensor for a braking system of a vehicle, comprising:
- a field generation component situated one of on or adjacent to one of (i) a driver brake force transmission component of the braking system or (ii) an actuator force transmission component of the braking system, wherein the field generation component generates at least one of a first electrical field and a first magnetic field having a predefined intensity distribution in a spatial axis system defined fixedly with respect to a first body, the first body being one of the following two components: (i) the driver brake force transmission component, or (ii) the actuator force transmission component;
- a sensor unit situated on the vehicle in such a way that the driver brake force transmission component and the actuator force transmission component are displaceable in relation to the sensor unit, wherein the sensor unit detects at least one intensity variable of at least one of a second electrical field and a second magnetic field, the at least one of the second electrical field and the second magnetic field being generated due to an interaction of the at least one of the first electrical field and the first magnetic field with a second body, the second body being the other one of the following two components: (i) the driver brake force transmission component, or (ii) the actuator force transmission component, the second body being different from the first body, the at least one intensity variable being at least one of a light intensity and a magnetic field strength, wherein the sensor unit is fixed in place on the vehicle, and is stationary and fixed in place relative to the vehicle frame; and
- an electronic analysis unit which determines, by taking into consideration the at least one intensity variable detected by the sensor unit, an item of output information with respect to a differential travel present between the driver brake force transmission component and the actuator force transmission component;
- wherein the driver brake force transmission component is displaceable in relation to the sensor unit via a driver brake force transmitted via a brake actuating element of a driver;
- wherein the actuator force transmission component is displaceable in relation to the sensor unit via a component of a brake booster; and
- wherein the driver brake force transmission component and the actuator force transmission component are displaceable relative to each other.

2. The differential travel sensor as recited in claim 1, wherein the field generation component includes a permanent magnet situated fixedly on the first body so that the permanent magnet moves with the first body in a first movement path.

3. The differential travel sensor as recited in claim 1, wherein the field generation component includes a light source.

4. The differential travel sensor as recited in claim 3, wherein the light source is situated adjacent to one of the driver brake force transmission component or the actuator force transmission component in such a way that the driver brake force transmission component and the actuator force transmission component are displaceable in relation to the light source.

5. The different travel sensor as recited in claim 1, wherein the at least one intensity variable includes the magnetic field strength.

6. The different travel sensor as recited in claim 1, wherein the at least one intensity variable includes the light intensity.

7. The differential travel sensor as recited in claim 1, wherein the sensor unit is powered by a power supply, and the sensor unit is non-displaceably fixed on the vehicle relative to the power supply.

8. A brake booster device for a braking system of a vehicle, comprising:
- a differential travel sensor including:
  - a field generation component situated one of on or adjacent to one of (i) a driver brake force transmission component of the braking system or (ii) an actuator force transmission component of the braking system, wherein the field generation component generates at least one of a first electrical field and a first magnetic field having a predefined intensity distribution in a spatial axis system defined fixedly with respect to a first body, the first body being one of the following two components: (i) the driver brake force transmission component, or (ii) the actuator force transmission component, wherein the field generation component includes a permanent magnet situated fixedly on the first body;
  - a sensor unit situated on the vehicle in such a way that the driver brake force transmission component and the actuator force transmission component are displaceable in relation to the sensor unit, wherein the sensor unit detects at least one intensity variable of at least one of a second electrical field and a second magnetic field, the at least one of the second electrical field and the second magnetic field being generated due to an interaction of the at least one of the first electrical field and the first magnetic field with a second body, the second body being the other one of following two components: (i) the driver brake force transmission component, or (ii) the actuator force transmission component, the second body being different from the first body, the at least one intensity variable being a magnetic field strength, wherein the sensor unit is fixed in place on the vehicle, and is stationary and fixed in place relative to the vehicle frame; and
  - an electronic analysis unit which determines, by taking into consideration at least one intensity variable detected by the sensor unit, an item of output information with respect to a differential travel present between the driver brake force transmission component and the actuator force transmission component;
  - wherein the driver brake force transmission component is displaceable in relation to the sensor unit via a driver brake force transmitted via a brake actuating element of a driver;
  - wherein the actuator force transmission component is displaceable in relation to the sensor unit via a component of a brake booster; and
  - wherein the driver brake force transmission component and the actuator force transmission component are displaceable relative to each other.

9. The brake booster device as recited in claim 8, wherein the brake booster device includes the driver brake force transmission component and the actuator force transmission component.

10. The brake booster device as recited in claim 9, wherein the one of the driver brake force transmission component or the actuator force transmission component, which functions as the second body and interacts with the permanent magnet of the field generation component, is at least partially produced from a ferromagnetic material.

11. A brake booster device for a braking system of a vehicle, comprising:
- a differential travel sensor including:
  - a field generation component situated adjacent to one of (i) a driver brake force transmission component of the braking system or (ii) an actuator force transmission component of the braking system, wherein the field generation component generates at least one of a first electrical field and a first magnetic field having a predefined intensity distribution in a spatial axis system defined fixedly with respect to a first body which is one of the driver brake force transmission component or the actuator force transmission component, wherein the field generation component includes a light source;
  - a sensor unit situated on the vehicle in such a way that the driver brake force transmission component and the actuator force transmission component are displaceable in relation to the sensor unit, wherein the sensor unit determines at least one intensity variable of at least one of a second electrical field and a second magnetic field generated due to an interaction of the at least one of the first electrical field and the first magnetic field with a second body which is one of the driver brake force transmission component or the actuator force transmission component, the second body being different from the first body, wherein the sensor unit fixed in place on the vehicle, and is stationary and fixed in place relative to the vehicle frame; and
  - an analysis unit which determines, by taking into consideration the at least one intensity variable, an item of output information with respect to a differential travel present between the driver brake force transmission component and the actuator force transmission component;
  - wherein at least one light-transmissive area is provided in each of the driver brake force transmission component and the actuator force transmission component.

12. The brake booster device as recited in claim 11, wherein at least one first light-transmissive area and one second light-transmissive area are implemented in each of the driver brake force transmission component and the actuator force transmission component, and wherein a first vector representing a relative position of the first light-transmissive area of the driver brake force transmission component in relation to the second light-transmissive area of the driver brake force transmission component is offset in relation to a second vector representing a relative position of the first light-transmissive area of the actuator force transmission component in relation to the second light-transmissive area of the actuator force transmission component by a third vector aligned parallel to a displacement axis along which the driver brake force transmission component is displaceable in relation to the actuator force transmission component.

13. The brake booster device as recited in claim 11, wherein at least one of:
- (i) the driver brake force transmission component is at least one subunit of an input piston via which a driver brake force is transmittable from a brake actuating element to at least one displaceable piston of a brake master cylinder; and
- (ii) the actuator force transmission component is at least one subunit of a booster piston via which an actuator force is transmittable from an actuator to the at least one displaceable piston of the brake master cylinder.

14. The brake booster device as recited in claim 8, wherein the at least one intensity variable includes the magnetic field strength.

15. The brake booster device as recited in claim 8, wherein the sensor unit is powered by a power supply, and the sensor unit is non-displaceably fixed on the vehicle relative to the power supply.

16. The brake booster device as recited in claim 11, wherein the sensor unit is fixed in place in the vehicle and is non-displaceable relative to the vehicle.

17. The brake booster device as recited in claim 8, wherein the field generation component includes a permanent magnet situated fixedly on the first body so that the permanent magnet moves with the first body in a first movement path.

18. A method for ascertaining a differential travel present between a driver brake force transmission component and an actuator force transmission component of a braking system of a vehicle, comprising:
- generating at least one of a first electrical field and a first magnetic field having a predefined intensity distribution in a spatial axis system defined fixedly with respect to a first body, the first body being one of the following two components: (i) the driver brake force transmission component, or (ii) the actuator force transmission component;
- detecting, by a sensor unit situated on the vehicle, at least one intensity variable of at least one of a second electrical field and a second magnetic field generated due to an interaction of the at least one of the first electrical field and the first magnetic field with a second body, the second body being the other one of the following two components: (i) the driver brake force transmission component, or (ii) the actuator force transmission component, the second body being different from the first body, the at least one intensity variable being at least one of a light intensity and a magnetic field strength, wherein the sensor unit is fixed in place on the vehicle and is stationary and fixed in place relative to the vehicle frame; and
- determining, using an electronic analysis unit, by taking into consideration the at least one of the light intensity and the magnetic field strength detected by the sensor unit, an item of output information with respect to a differential travel present between the driver brake force transmission component and the actuator force transmission component;
- wherein the driver brake force transmission component is displaceable in relation to the sensor unit via a driver brake force transmitted via a brake actuating element of a driver;
- wherein the actuator force transmission component is displaceable in relation to the sensor unit via a component of a brake booster; and
- wherein the driver brake force transmission component and the actuator force transmission component are displaceable relative to each other.

19. The method as recited in claim 18, wherein a permanent magnet is fixedly situated on the first body to generate a magnetic field distribution which is (i) fixed with respect to the first body and (ii) at least a partial component of the at least one of the first electrical field and the first magnetic field; and wherein the permanent magnet is fixedly situated on the first body so that the permanent magnet moves with the first body in a first movement path.

20. The method as recited in claim 18, wherein the at least one intensity variable includes the magnetic field strength.

21. The method as recited in claim 18, wherein the at least one intensity variable includes the light intensity.

22. The method as recited in claim 18, wherein the sensor unit is powered by a power supply, and the sensor unit is non-displaceably fixed on the vehicle relative to the power supply.

23. The method as recited in claim 18, wherein the field generation component includes a permanent magnet situated fixedly on the first body so that the permanent magnet moves with the first body in a first movement path.

* * * * *